US012707541B2

(12) United States Patent
Archer et al.

(10) Patent No.: US 12,707,541 B2
(45) Date of Patent: Aug. 11, 2026

(54) LIGHT DRIVER CAPABLE OF DEACTIVATING CCT CONTROL IN THE PRESENCE OF TRIAC DIMMING

(71) Applicant: ERP POWER, LLC, Westlake Village, CA (US)

(72) Inventors: Michael Archer, Moorpark, CA (US); Louis Chen, Simi Valley, CA (US); James H. Mohan, Valencia, CA (US); Steven C. Krattiger, Northridge, CA (US); Erik Morales, Los Angeles, CA (US)

(73) Assignee: ERP POWER, LLC, Westlake Village, CA (US)

( * ) Notice: Subject to any disclaimer, the term of this patent is extended or adjusted under 35 U.S.C. 154(b) by 0 days.

(21) Appl. No.: 18/926,215

(22) Filed: Oct. 24, 2024

(65) Prior Publication Data

US 2025/0142697 A1 May 1, 2025

Related U.S. Application Data

(60) Provisional application No. 63/593,136, filed on Oct. 25, 2023.

(51) Int. Cl.

*H05B 45/20* (2020.01)
*H05B 45/10* (2020.01)
*H05B 45/31* (2020.01)
*H05B 45/325* (2020.01)

(52) U.S. Cl.

CPC ............. *H05B 45/20* (2020.01); *H05B 45/10* (2020.01); *H05B 45/31* (2020.01); *H05B 45/325* (2020.01)

(58) Field of Classification Search

CPC ........ H05B 45/20; H05B 45/10; H05B 45/31; H05B 45/325; H05B 47/19

See application file for complete search history.

(56) References Cited

U.S. PATENT DOCUMENTS

| | | | | |
|---|---|---|---|---|
| 10,178,729 | B2 * | 1/2019 | Yang | H05B 45/395 |
| 2013/0063035 | A1 * | 3/2013 | Baddela | H05B 45/3577 315/192 |
| 2016/0330808 | A1 * | 11/2016 | Brandt | H05B 45/375 |
| 2017/0164440 | A1 * | 6/2017 | Hu | H05B 45/10 |

* cited by examiner

*Primary Examiner* — Renan Luque

(74) *Attorney, Agent, or Firm* — Womble Bond Dickinson (US) LLP

(57) ABSTRACT

A light driver includes a phase-cut detector configured to determine whether phase-cut dimming is present at an input of the light driver and to generate a phase-cut detection signal in response to presence of the phase-cut dimming; and a channel controller coupled to the phase-cut detector and configured to perform receiving a current correlated color temperature (CCT) value for adjusting a CCT of an output light of a light source coupled to the light driver; and in response to receiving the phase-cut detected signal from the phase-cut detector, disregarding the CCT value by maintaining a fixed CCT at the output light and adjusting an intensity of the output light based on a level of phase-cutting at the input of the light driver.

18 Claims, 3 Drawing Sheets

LIGHT DRIVER CAPABLE OF DEACTIVATING CCT CONTROL IN THE PRESENCE OF TRIAC DIMMING

CROSS-REFERENCE TO RELATED APPLICATION(S)

This application claims priority to and the benefit of U.S. Provisional Patent Application No. 63/593,136, filed in the United States Patent and Trademark Office on Oct. 25, 2023, the entire disclosure of which is incorporated by reference herein.

FIELD

Aspects of the present disclosure are related to light emitting diode (LED) drivers.

BACKGROUND

A light emitting diode (LED) is an electronic device that converts electrical energy (commonly in the form of electrical current) into light. An LED driver is an essential component in LED lighting systems, and its primary function is to regulate and control the electrical current and voltage supplied to an LED or an array of LEDs Currently, triode for alternating current (TRIAC) dimming, also known as phase-cut/Leading edge/trailing edge dimming, is a widely used method of controlling the intensity of LED lights. It works by adjusting the phase angle at which the AC voltage is applied to the LED luminaire or transformer. This determines how much of the AC waveform is allowed to pass through to the LED driver and ultimately the LED lights, and at low dimmer settings, the root mean square (RMS) power received by the light driver may not be sufficient to properly bias all of its internal circuitry. This may lead to incorrect detection of signals at the light driver's inputs.

The above information disclosed in this Background section is only for enhancement of understanding of the disclosure, and therefore it may contain information that does not form the prior art that is already known to a person of ordinary skill in the art.

SUMMARY

Aspects of some embodiments of the present disclosure are directed to a light driver with CCT and dimmer inputs, but which is also capable of dimming its output based on an input from a phase-cut dimmer. In some embodiments, the light driver is configured to detect phase-cut dimming at its input (e.g., by a TRIAC dimmer) and to ignore any signal received at its CCT and dimmer inputs in response. Therefore, in the presence of phase-cut dimming, the light output of the LEDs will not be affected by noise or perceived signals at the CCT and dimmer inputs of the light driver, and the driver is capable of maintaining a consistent light output in the presence of dimming by the TRIAC dimmer.

According to some embodiments of the present disclosure, there is provided a light driver including: a phase-cut detector configured to determine whether phase-cut dimming is present at an input of the light driver and to generate a phase-cut detection signal in response to presence of the phase-cut dimming; and a channel controller coupled to the phase-cut detector and configured to perform: receiving a current correlated color temperature (CCT) value for adjusting a CCT of an output light of a light source coupled to the light driver; and in response to receiving the phase-cut detected signal from the phase-cut detector, disregarding the CCT value by maintaining a fixed CCT at the output light and adjusting an intensity of the output light based on a level of phase-cutting at the input of the light driver.

In some embodiments, the fixed CCT corresponds to a previously received CCT value, and the previously received CCT value is different from the current CCT value.

In some embodiments, the light driver further includes: a CCT receiver configured to receive a CCT control signal from a CCT control device, and to generate the current CCT value for transmission to the channel controller.

In some embodiments, CCT control device is a CCT clamp or a CCT adjustment device.

In some embodiments, the CCT receiver includes an antenna configured to be wirelessly connected to the CCT control device.

In some embodiments, the channel controller is further configured to perform: receiving a dimmer level for adjusting an intensity the output light of the light source; and in response to receiving the phase-cut detected signal from the phase-cut detector, disregarding the dimmer level by not adjusting the intensity of the output light based on the dimmer level.

In some embodiments, the light driver further includes: a dimmer receiver configured to receive a dimmer control signal from a dimming control device, and to generate the dimmer level for transmission to the channel controller.

In some embodiments, the dimmer receiver includes a 0-10V dimmer having a rocker interface, a tap interface, a slide interface, or a rotary interface.

In some embodiments, the dimmer receiver includes an antenna configured to be wirelessly connected to the dimming control device.

In some embodiments, the channel controller is further configured to perform: in response to not receiving the phase-cut detected signal from the phase-cut detector, adjusting the CCT of the output light based on the current CCT value.

In some embodiments, the phase-cut detector includes: a pulse generator circuit configured to generate a pulsed signal based on a rectified input line voltage; a dimming detection circuit configured to determine whether phase-cut dimming is present at the input of the light driver based on the pulsed signal and to generate the phase-cut detection signal.

In some embodiments, the pulsed signal is a pulse-width-modulated (PWM) signal having a duty cycle corresponding to a phase-cut of the rectified input line voltage.

In some embodiments, the light driver further includes: a first voltage divider configured to generate an attenuated rectified voltage based on the rectified input line voltage, wherein the pulse generator circuit is configured to receive the attenuated rectified voltage and to generate the pulsed signal based on a comparison of the attenuated rectified voltage and a reference signal.

In some embodiments, the pulsed signal is a pulse-width-modulated (PWM) signal having a duty cycle corresponding to a phase-cut of the rectified input line voltage.

In some embodiments, an input of the light driver is coupled to a phase-cut dimmer configured to perform phase-cutting of an input line voltage based on a dimmer setting.

In some embodiments, the light driver further includes: a rectifier configured to rectify an input line voltage to generate the rectified input line voltage; and a converter configured to convert the rectified input line voltage into a drive signal for powering a light source coupled to the light driver, wherein the input line voltage from which the rectified input line voltage is generated is from 100 Vac to 277 Vac.

According to some embodiments of the present disclosure, there is provided a lighting system including: a rectifier configured to receive a phase-cut input line voltage from a phase-cut dimmer at an input of the rectifier and configured to generate a rectified input line voltage; and a light driver configured to drive a light source, and including: a phase-cut detector configured to determine whether phase-cut dimming is present at an input of the light driver based on the rectified input line voltage and to generate a phase-cut detection signal in response to presence of the phase-cut dimming; and a channel controller coupled to the phase-cut detector and configured to perform: receiving a correlated color temperature (CCT) value and a dimmer level for adjusting an intensity and a CCT of an output light of the light source; and in response to receiving the phase-cut detected signal from the phase-cut detector, disregarding the CCT value and the dimmer level by maintaining a fixed CCT at the output light and adjusting an intensity of the output light based on a level of phase-cutting at the input of the light driver.

According to some embodiments of the present disclosure, there is provided a method of driving a light source by a light driver, the method including: receiving a current correlated color temperature (CCT) value for adjusting a CCT of an output light of the light source; determining whether phase-cut dimming is present at an input of the light driver; and in response to determining that the phase-cut dimming is present at the input, disregarding the current CCT value by maintaining a fixed CCT at the output light and adjusting an intensity of the output light based on a level of the phase-cutting at the input of the light driver.

In some embodiments, determining that the phase-cut dimming is present at the input includes: receiving a phase-cut detection signal in response to phase-cut dimming at the input of the light driver.

In some embodiments, the fixed CCT corresponds to a previously received CCT value, and the previously received CCT value is different from the current CCT value.

In some embodiments, the method further includes: receiving a dimmer level for adjusting an intensity the output light of the light source; and in response to determining that the phase-cut detected signal is received, disregarding the dimmer level by not adjusting the intensity of the output light based on the dimmer level.

In some embodiments, the method further includes: in response to determining that the phase-cut dimming is not received at the input, adjusting the CCT of the output light based on the current CCT value.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of light drivers, provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Aspects of embodiments of the present disclosure are directed to a light driver that is configured to detect phase-cut dimming at its input (e.g., by a TRIAC dimmer) and to ignore any signal received at its CCT and dimmer inputs. Therefore, the light output of the LEDs will not be affected by noise or perceived signals at the CCT and dimmer inputs of the light driver. As a result, in the presence of phase-cut dimming, the driver is capable of maintaining a consistent light output in the presence of dimming by the TRIAC dimmer. In some embodiments, the light driver deactivates the CCT and dimmer inputs or ignores the corresponding input signals only when phase-cut dimming is performed, and the PFC circuit operates as intended when no phase-cut dimmer is attached or there is no phase-cut dimming.

Figure 1:
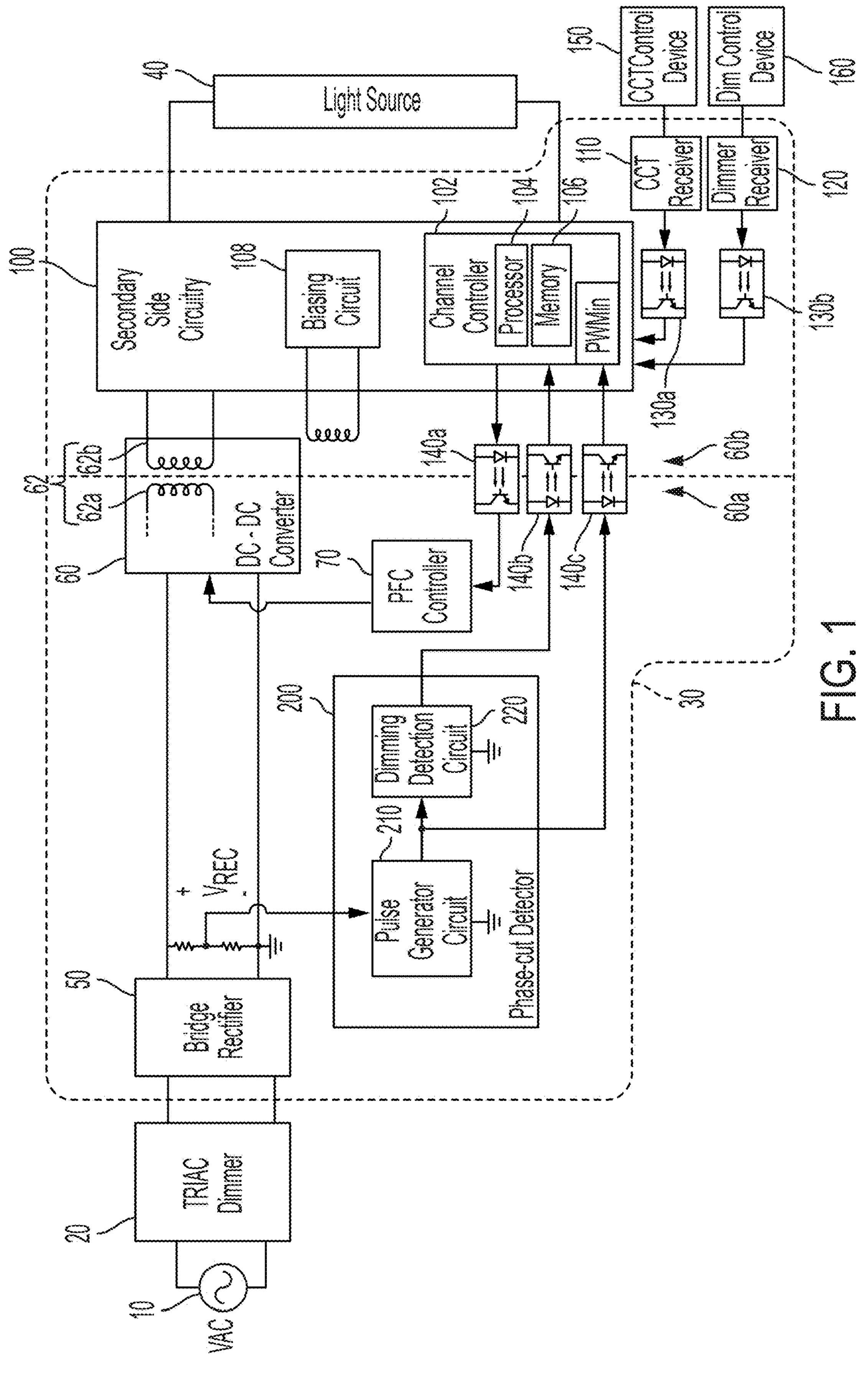
FIG. 1 illustrates a lighting system including a light driver coupled to a phase-cut dimmer, according to some example embodiments of the present disclosure.

FIG. 1 illustrates a lighting system including a light driver coupled to a phase-cut dimmer, according to some example embodiments of the present disclosure.

According to some embodiments, the lighting system 1 includes an input source 10, a dimmer 20, a light driver 30 (e.g., a switched-mode power supply) for powering and controlling the brightness of a light source 40 based on the signal from the input source 10.

The input source 10 may include an alternating current (AC) power source that may operate at a 100 Vac (e.g., in Japan), 120 Vac (e.g., in the US), a 240 Vac (e.g., in Europe), or 277 Vac (e.g., in large industrial plants). The dimmer 20 may include a phase-cut dimmer electrically powered by said AC power sources. The dimmer 20 may modify (e.g., cut/chop a portion of) the input AC signal according to a dimmer level before sending it to the light driver 30, and thus variably reduces the electrical power delivered to the light driver 30 and the light source 40. In some examples, the dimmer 20 may be a triode for alternating current (TRIAC) dimmer and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 40 may include one or more light-emitting-diodes (LEDs) or an arc or gas discharge lamp with electronic ballasts, such as high intensity discharge (HID) or fluorescent lights.

In some embodiments, the light driver 30 includes a rectifier 50, a converter (e.g., a DC-DC converter) 60, a power factor correction (PFC) circuit (e.g., a current-mode PFC controller) 70, and a secondary-side circuit 100. The rectifier 50 provides a same polarity of output for either polarity of the AC signal from the input source 10. In some examples, the rectifier 50 may be a full-wave circuit using a center-tapped transformer, a full-wave bridge circuit with four diodes, a half-wave bridge circuit, or a multi-phase rectifier.

The converter 60 converts the rectified AC signal generated by the rectifier 50 into a drive signal for powering and controlling the brightness of the light source 40. The drive signal may depend on the type of the one or more LEDs of the light source 40. For example, when the one or more LEDs of the light source 40 are constant current LEDs the drive signal may be a variable voltage signal, and when the light source 40 requires constant voltage, the drive signal may be a variable current signal. In some embodiments, the converter 60 includes a boost converter for maintaining (or attempting to maintain) a constant DC bus voltage on its output while drawing a current that is in phase with and at the same frequency as the line voltage (by virtue of the PFC circuit 70). A transformer 62 inside the converter 60 produces the desired output voltage from the DC bus. The converter 60 has a primary side 60*a* and a secondary side 60*b* that is electrically isolated from, and inductively coupled to, the primary side 60*a*. The primary and secondary sides 60*a* and 60*b* may correspond to the primary and secondary windings 62*a* and 62*b* of the transformer 62.

The secondary-side circuit 100 includes a channel controller 102 that controls the color intensity (as measured by lumens, Lm) of each of the color channels (e.g., red, blue, and green color channels) of the light source 40, thus enabling light dimming and adjusting the color mixing of the channels to produce a desired light output color. The channel controller 102 may also be part of a feedback loop for controlling the output power of the converter 60. The secondary-side circuit 100 may also include a biasing circuit (e.g., a linear regulator, such as a low dropout regulator (LDO)) 108 that is coupled to, and receives power from, a secondary winding 62*c* of the converter 60 and produces one or more bias voltages that may be used to power the various circuits of the secondary-side circuit 100 (such as the channel controller 102).

PFC circuit 70 improves (e.g., increases) the power factor of the load on the input source 10 and reduces the total harmonic distortions (THD) of the light driver 30. As non-linear loads including the rectifier 50 and the converter 60 distort the current drawn from the input source 10, the PFC circuit 70 counteracts the distortion and raises the power factor. In some examples, other sources of current distortion may be input filter capacitors, input filter chokes, boost inductor, second stage transformer, and any non-linear elements or loads on the secondary side of a transformer 62 inside the converter 60, which would be reflected over to the primary side of the transformer 62. Further, the main switch (e.g., transistor) in the PFC/boost stage of the converter 60 may also distort the current if it is fed with a constant duty cycle or constant on time. The PFC circuit 70 is capable of counteracting current distortions regardless of the source.

In some embodiments, the channel control 102 facilitates the regulation of the output of the converter by providing a feedback control signal to the PFC circuit 70 (e.g., via an optocoupler 140*a*).

The channel controller 102 includes a processor (or processing circuit) 104 that serves as the central processing unit of the channel controller 102 and manages data flow and executes control algorithms for the channel controller 102. The memory 106 provides storage for data and system configurations that are required for system operation.

As used herein, the terms "processor" and "processing circuit" include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

In some embodiments, the light driver 30 further includes a CCT receiver (e.g., a digital CCT receiver) 110 that is configured to be communicatively connected to, and to receive a CCT control signal from, an external CCT control device 150. Further, the light driver 30 may include a dimmer receiver (e.g., a digital dimmer receiver) 120 that is configured to be communicatively connected to, and to receive a dimmer control signal from, an external dimming control device 160. In some examples, the CCT control device 150 may be a CCT clamp producing a fixed signal or a CCT adjustment device capable of producing a variable signal. In some examples, each of the CCT control device 150 and the dimming control device 160 may be a 0-10V dimmer, which produces a voltage signal for regulating the CCT/brightness of the output light. In some embodiments, the channel controller 102 determines the correlated color temperature (CCT) of the light emitted by the color channels of the light driver 30 based on the CCT control signal received through the CCT receiver 110, and may determine the intensity of emitted light based on the dimmer control signal received through the dimmer receiver 120. The CCT receiver 110 and the dimmer receiver 120 may be powered by the biasing circuit 108 of the secondary-side circuit 100.

In some examples, the CCT receiver 110 and the dimmer receiver 120, which interface with the environment outside of the light driver 30 may be electrically isolated from, yet in communication with, the channel controller 102 via optocouplers. For example, the optocouplers 130*a* and 130*b* may convey (e.g., electro optically convey) signals from the CCT receiver 110 and the dimmer receiver 120, respectively, to the channel controller 102 without there being a direct electrical connection between these components. However, embodiments of the present disclosure are not limited thereto, and in examples in which electrical isolation is not required, the optocouplers 130*a* and 130*b* may be omitted and the CCT receiver 110 and the dimmer receiver 120 may be directly connected to the channel controller 102 via a wire or electrical connection.

In the related art, when a TRIAC dimmer 20 is present and the power signal received by the light driver is phase-cut (i.e., dimmed), the light driver 30 receives less root mean square (RMS) power, which may lower the RMS voltage at the output of the secondary side 60*b* of the transformer 62, and thus cause the biasing voltage(s) produced by the biasing circuit 108 and applied to the CCT and dimmer receivers 110 and 120 to drop undesirably. This may cause the channel controller 102 to perceive a lowered signal at its CCT and DIM inputs and incorrectly determine that the CCT and/or dimmer values have changed, and thus mistakenly change brightness of the output light in a manner not commensurate with the phase-cutting at the TRIAC dimmer 20 and/or to mistakenly change the CCT of the output light. In other words, dimming by the TRIAC dimmer 20 could cause the CCT and/or intensity of the light output to change in an undesirable way.

To prevent such undesirable effects, in some embodiments, the light driver 30 according to some embodiments detects when phase-cut dimming is performed by the phase-cut dimmer 20 (e.g., the TRIAC dimmer) at the input of the driver 30 and ignores any signal from the CCT and dimmer receivers 110 and 120. Thus, according to some embodiments, the light driver 30 further includes a phase-cut detector 200 that detects when phase-cut dimming is performed by the dimmer 20 (e.g., the TRIAC dimmer) at the input of the driver 30 and signals the channel controller 102 to ignore all input from the CCT receiver 110 and dimmer receiver 120 in response. For example, when the a TRIAC dimmer 20 is detected at the input of the light driver 30, the channel controller 102 controls the light CCT to be at the most-recently (or previously) stored CCT value, and proceeds to control dimming based on the phase-cut dimming at the dimmer 20, and not any signal received from the dimmer receiver 120.

In some embodiments, the phase-cut detector 200 is configured to receive the rectified signal $V_{REC}$ that is produced by the bridge rectifier 50 (or receives an attenuated rectified signal) and generates a phase-cut detection signal in response to presence of the phase-cut dimming. In some examples, the level of the phase-cut detection signal is indicative of a presence or absence of phase-cut dimming. The channel controller 102 is configured to receive the phase-cut detection signal from the phase-cut detector 200, a CCT value from the CCT receiver 110, and a dimmer level from the dimmer receiver 120.

According to some embodiments, when the channel controller 102 receives the phase-cut detected signal, it ignores/disregards the CCT value and the dimmer level by not changing the output light CCT (e.g., maintaining a fixed CCT at the output light) and by only adjusting the intensity of the output light based on a level of phase-cutting of the input of the light driver 30, and not based on the dimmer level received from the dimmer receiver 120. For example, the fixed CCT maintained by the channel controller 102 may corresponds to a previously received CCT value, which may be different from the current CCT value.

However, when the phase-cut detected signal is not received (e.g., when no TRIAC dimmer is present or when the TRIAC dimmer is set to 100% dimming), the channel controller 102 operates normally and reverts to adjusting the CCT and the intensity of the output light based on the current CCT value and the dimmer level, respectively.

In some embodiments, the phase-cut detector 200 includes a pulse generator circuit 210 and a dimming detection circuit 220. The pulse generator circuit 210 is configured to generate a pulsed signal (e.g., a pulse-width-modulated (PWM) signal) based on the rectified input line voltage $V_{REC}$. The pulsed signal may correspond to the signal received by the rectifier 50, which may be a chopped waveform from the phase-cut dimmer 20. Thus, the pulsed signal may be indicative of the light dimming level (e.g., the dimming level set by a user via the phase-cut dimmer 20). In some examples, in addition to providing the pulsed signal to the dimming detection circuit 220, the pulse generator circuit 210 provides this signal to the PWM input of the channel controller 102 so that the controller 102 may determine the dimming level set by a user at the phase-cut dimmer 20 and adjust the light output intensity of the light source 40 accordingly.

In some embodiments, the dimming detection circuit 220 is configured to determine whether a phase-cut dimmer 20 is performing dimming at the input of the driver 30 based on the pulsed signal and to generate the phase-cut detection signal in response, which is transmitted to the channel controller 102.

As shown in FIG. 1, in examples in which the channel controller 102 is at the secondary side **60*b* of the transformer 62, the phase-cut detection signal and the pulsed signal may be communicated to the channel controller 102 via the optocouplers 140*b* and 140*c*, respectively. However, embodiments of the present disclosure are not limited thereto, and when the channel controller 102 is not electrically isolated from the phase-cut detector 200**, the signal may be communicated directly via an electrical connection.

Figure 2:
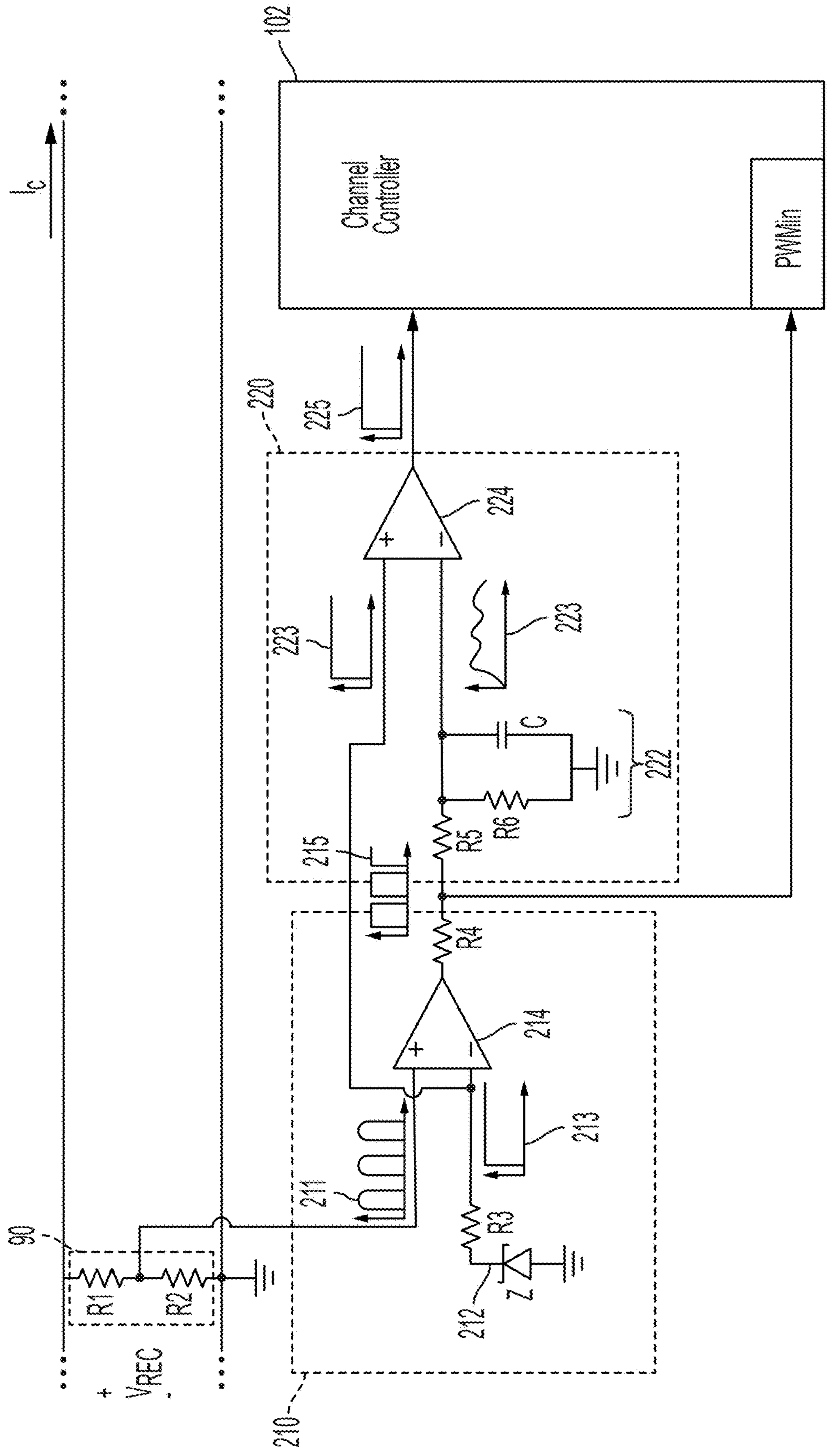
FIG. 2 illustrates a schematic view of a pulse generator circuit and a dimming detection circuit of the light driver, according to some example embodiments of the present disclosure.

FIG. 2 illustrates a schematic view of the pulse generator circuit 210 and the dimming detection circuit 220, according to some example embodiments of the present disclosure.

In some embodiments, the pulse generator circuit 210 includes a reference generator 212 that is configured to generate a reference signal (e.g., a constant voltage) 213, and a first comparator 214 that is configured to receive the reference signal 213 and the attenuated rectified voltage 211 from the first voltage divider 90 (with resistors R1 and R2), and to generate the pulsed signal 215 based on a comparison of the reference signal 213 and the attenuated rectified voltage 211.

In some examples, the reference generator 212 may include a zener diode Z that is biased to generate a constant zener reference voltage that may be about 2 V to 12 V. The zener diode Z may be biased via a secondary winding **60*b* of the converter 60**, or through any other suitable source.

The first comparator 214 may include a first operational amplifier having a positive input terminal that is configured to receive the first reduced rectified voltage 211, and a negative input terminal coupled to the reference generator (e.g., to the cathode of the zener diode Z) and configured to receive the reference signal 213. The pulsed signal 215 generated by the first comparator 214 may be a pulse-width-modulated (PWM) signal having a duty cycle that corresponds to a phase-cut of rectified input line voltage $V_{REC}$ and thus indicates the dimming level at the dimmer 20. For example, a duty cycle less than 100% may indicate the presence of dimming. The first comparator 214 may transmit this PWM signal to the dimming detection circuit 220 as well as to the channel controller 102.

According to some embodiments, the dimming detection circuit 220 includes a filter (e.g., a low pass filter) 222 that is configured to low pass filter the pulsed signal 215 and to produce a filtered signal 223, which may be a quasi-sawtooth signal. In some examples, the filter 222 may be a passive low pass RC filter with resistors R5 and R6 and capacitor C, and the filtered signal may be a quasi-sawtooth signal. The dimming detection circuit 220 further includes a second comparator 224 that is configured to receive the reference signal 213 and the filtered signal 223 and to produce the phase-cut detection signal 225, the level of which is indicative of a presence or absence of the phase-cut dimming. The second comparator 224 may include a second operational amplifier having a positive input terminal configured to receive the reference signal 213 from the reference generator 212, and a negative input terminal coupled to the filter 222 and configured to receive the filtered signal 223.

The first and second comparators 214 and 224 may be electrically powered by a secondary winding of the converter 60, or through any other suitable source. For example, the first and second comparators 214 and 224 may be biased through the bias voltage produced by the biasing circuit 108.

In some embodiments, the voltage of the reference signal 213 may be set such that if any portion of the input line voltage is chopped, the filtered signal 223 falls below the reference voltage 213 causing the second comparator 224 to generate a high-level signal (i.e., the "phase-cut detection signal" or a "second level") and if the signal is not chopped at all (e.g., if there is no phase-cut dimming), then the filtered signal 223 exceeds the reference voltage 213 causing the second comparator 224 to generate a low-level signal (a "first level"). Thus, the dimming detection circuit 220 generates a binary output (i.e., phase-cut detection signal) indicating whether the input AC signal is being chopped by a phase-cut dimmer or not. As will be understood, the voltage level of the phase-cut detection signal is not limited to the above, and for example, may be inverted if suitable changes are made to the phase-cut detector 200 and the channel controller 102.

Figure 3:
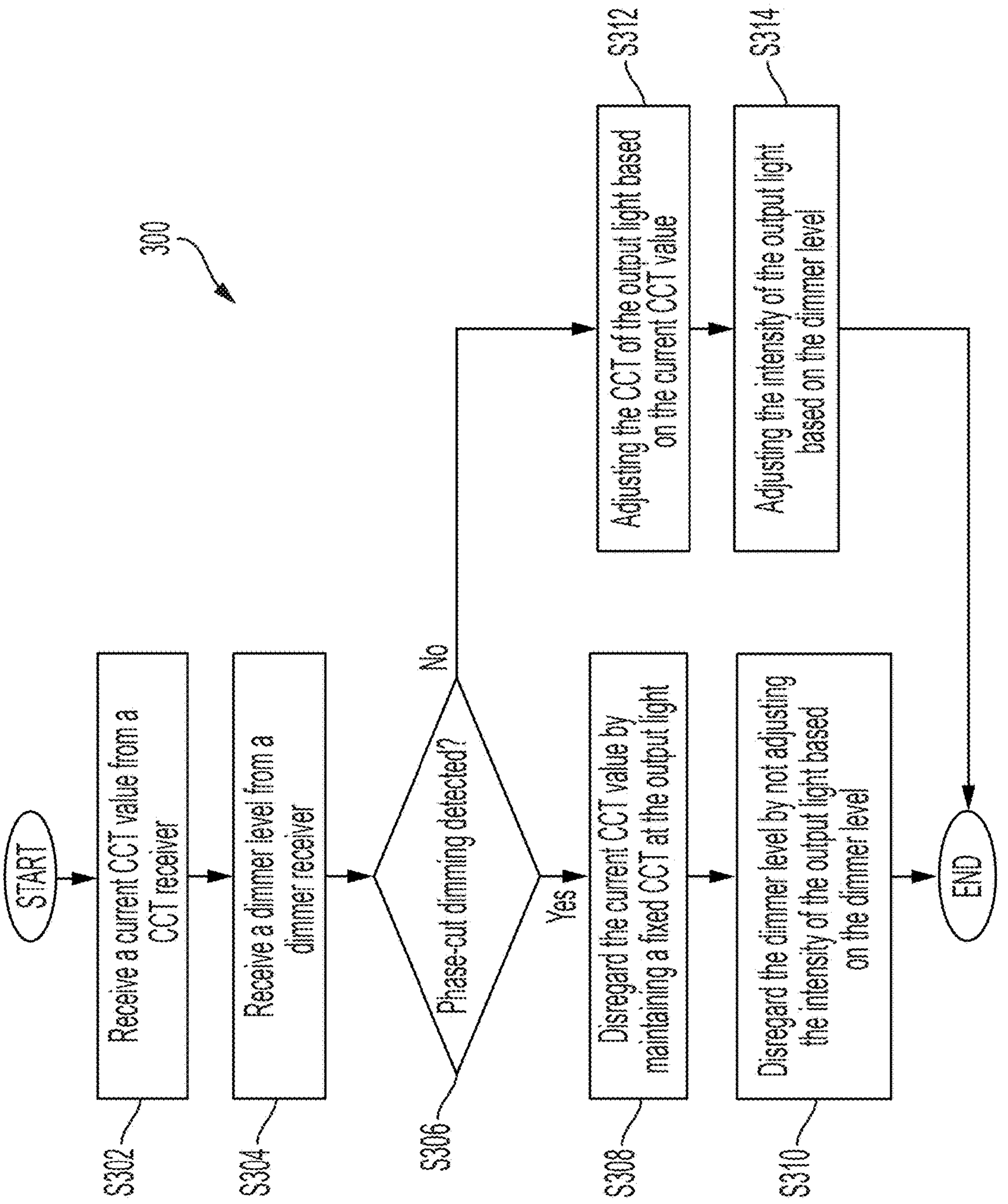
FIG. 3 illustrates a process 300 of driving the light source 40 by the light driver 30, according to some embodiments of the present disclosure.

FIG. 3 illustrates a process 300 of driving the light source 40 by the light driver 30, according to some embodiments of the present disclosure.

Referring to FIG. 3, the channel controller 102 receives a current CCT value for adjusting a CCT of an output light of the light source 40 from the CCT receiver 110 (S302), and receives a dimmer level for adjusting the intensity the output light of the light source 40 from the dimmer receiver 120 (S304).

In some embodiments, the channel controller 102 determines whether phase-cut dimming is present at an input of the light driver 30 (S306).

When the channel controller 102 determines that phase-cut dimming is present at the input (e.g., when a phase-cut detection signal is received in response to phase-cut dimming at the input of the light driver), it disregards/ignores the current CCT value by maintaining a fixed CCT at the output light (S308). Here, the fixed CCT may correspond to a previously received CCT value, which may be different from the current CCT value. The channel controller 102 may also disregard/ignore the dimmer level by not adjusting the intensity of the output light based on the dimmer level and instead adjust the light intensity based on a level of the phase-cutting at the input of the light driver 30 (S310).

When the channel controller 102 determines that phase-cut dimming is not present at the input (e.g., when a phase-cut detection signal is not received), it operates as it normally would and adjusts the CCT of the output light based on the current CCT value (S312) and adjusts the intensity of the output light based on the dimmer level received from the dimmer receiver 120.

While some embodiments of the present disclosure describe the channel controller 102 as receiving the CCT value and the dimmer level from the CCT and dimmer receivers 110 and 120, respectively, embodiments of the present disclosure are not limited thereto. For example, the channel controller 102 may include a wireless transceiver that allows is to receive the CCT value and/or the dimmer level from a wireless control device (e.g., a smart phone). In such examples, an antenna may functionally act as the CCT receiver and/or the dimmer receiver, and the CCT control device and/or the dimmer control device may be a wireless control device (e.g., a smart phone).

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The light driver and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the light driver may be formed on one integrated circuit (IC) chip or on separate IC chips. Further, the various components of the light driver may be implemented on a flexible printed circuit film, a tape carrier package (TCP), a printed circuit board (PCB), or formed on the same substrate. Further, the various components of the light driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and equivalents thereof.

What is claimed is:

1. A light driver comprising:

a phase-cut detector configured to determine whether phase-cut dimming is present at an input of the light driver and to generate a phase-cut detection signal in response to presence of the phase-cut dimming; and a channel controller coupled to the phase-cut detector and configured to perform: receiving a current correlated color temperature (CCT) value for adjusting a CCT of an output light of a light source coupled to the light driver; and in response to receiving the phase-cut detection signal from the phase-cut detector, disregarding the CCT value by maintaining a fixed CCT at the output light and adjusting an intensity of the output light based on a level of phase-cutting at the input of the light driver, wherein the fixed CCT corresponds to a previously received CCT value, and the previously received CCT value is different from the current CCT value.

2. The light driver of claim 1, further comprising:

a CCT receiver configured to receive a CCT control signal from a CCT control device, and to generate the current CCT value for transmission to the channel controller, wherein the CCT control device is a CCT clamp or a CCT adjustment device.

3. The light driver of claim 2, wherein the CCT receiver comprises an antenna configured to be wirelessly connected to the CCT control device.

4. The light driver of claim 1, wherein the channel controller is further configured to perform:

receiving a dimmer level for adjusting an intensity the output light of the light source; and in response to receiving the phase-cut detection signal from the phase-cut detector, disregarding the dimmer level by not adjusting the intensity of the output light based on the dimmer level.

5. The light driver of claim 4, further comprising:

a dimmer receiver configured to receive a dimmer control signal from a dimming control device, and to generate the dimmer level for transmission to the channel controller, wherein the dimmer receiver comprises a 0-10V dimmer having a rocker interface, a tap interface, a slide interface, or a rotary interface.

6. The light driver of claim 5, wherein the dimmer receiver comprises an antenna configured to be wirelessly connected to the dimming control device.

7. The light driver of claim 1, wherein the channel controller is further configured to perform:

in response to not receiving the phase-cut detection signal from the phase-cut detector, adjusting the CCT of the output light based on the current CCT value.

8. The light driver of claim 1, wherein the phase-cut detector comprises:

a pulse generator circuit configured to generate a pulsed signal based on a rectified input line voltage;

a dimming detection circuit configured to determine whether the phase-cut dimming is present at the input of the light driver based on the pulsed signal and to generate the phase-cut detection signal.

9. The light driver of claim 8, wherein the pulsed signal is a pulse-width-modulated (PWM) signal having a duty cycle corresponding to a phase-cut of the rectified input line voltage.

10. The light driver of claim 9, further comprising:

a first voltage divider configured to generate an attenuated rectified voltage based on the rectified input line voltage, wherein the pulse generator circuit is configured to receive the attenuated rectified voltage and to generate the pulsed signal based on a comparison of the attenuated rectified voltage and a reference signal.

11. The light driver of claim 8, wherein the pulsed signal is a pulse-width-modulated (PWM) signal having a duty cycle corresponding to a phase-cut of the rectified input line voltage.

12. The light driver of claim 1, wherein the input of the light driver is coupled to a phase-cut dimmer configured to perform phase-cutting of an input line voltage based on a dimmer setting.

13. The light driver of claim 1, further comprising:

a rectifier configured to rectify an input line voltage to generate the rectified input line voltage; and a converter configured to convert the rectified input line voltage into a drive signal for powering the light source coupled to the light driver, wherein the input line voltage from which the rectified input line voltage is generated is from 100 Vac to 277 Vac.

14. A lighting system comprising:

a rectifier configured to receive a phase-cut input line voltage from a phase-cut dimmer at an input of the rectifier and configured to generate a rectified input line voltage; and a light driver configured to drive a light source, and comprising:

a phase-cut detector configured to determine whether phase-cut dimming is present at an input of the light driver based on the rectified input line voltage and to generate a phase-cut detection signal in response to presence of the phase-cut dimming; and a channel controller coupled to the phase-cut detector and configured to perform:

receiving a current correlated color temperature (CCT) value and a dimmer level for adjusting an intensity and a CCT of an output light of the light source; and in response to receiving the phase-cut detection signal from the phase-cut detector, disregarding the CCT value and the dimmer level by maintaining a fixed CCT at the output light and adjusting an intensity of the output light based on a level of phase-cutting at the input of the light driver, wherein the fixed CCT corresponds to a previously received CCT value, and the previously received CCT value is different from the current CCT value.

15. A method of driving a light source by a light driver, the method comprising:

receiving a current correlated color temperature (CCT) value for adjusting a CCT of an output light of the light source;

determining whether phase-cut dimming is present at an input of the light driver; and in response to determining that the phase-cut dimming is present at the input, disregarding the current CCT value by maintaining a fixed CCT at the output light and adjusting an intensity of the output light based on a level of phase-cutting at the input of the light driver, wherein the fixed CCT corresponds to a previously received CCT value, and the previously received CCT value is different from the current CCT value.

16. The method of claim 15, wherein determining that the phase-cut dimming is present at the input comprises:

receiving a phase-cut detection signal in response to the phase-cut dimming at the input of the light driver.

17. The method of claim 16, further comprising:

receiving a dimmer level for adjusting an intensity the output light of the light source; and in response to determining that the phase-cut detection signal is received, disregarding the dimmer level by not adjusting the intensity of the output light based on the dimmer level.

18. The method of claim 15, further comprising:

in response to determining that the phase-cut dimming is not received at the input, adjusting the CCT of the output light based on the current CCT value.

* * * * *